United States Patent
Tseng et al.

(10) Patent No.: US 9,549,291 B2
(45) Date of Patent: Jan. 17, 2017

(54) CROWD ENHANCED CONNECTIVITY MAP FOR DATA TRANSFER INTERMITTENCY MITIGATION

(71) Applicant: Ford Global Technologies, LLC, Dearborn, MI (US)

(72) Inventors: Fling Tseng, Ann Arbor, MI (US); Dimitar Petrov Filev, Novi, MI (US); Imad Hassan Makki, Dearborn Heights, MI (US); Kwaku O. Prakah-Asante, Commerce Township, MI (US); Hsin-hsiang Yang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 14/230,101

(22) Filed: Mar. 31, 2014

(65) Prior Publication Data

US 2015/0281906 A1    Oct. 1, 2015

(51) Int. Cl.
*H04W 4/02*  (2009.01)
*H04B 1/3822*  (2015.01)
*H04L 29/08*  (2006.01)
*H04W 4/04*  (2009.01)

(52) U.S. Cl.
CPC .......... *H04W 4/027* (2013.01); *H04B 1/3822* (2013.01); *H04L 67/322* (2013.01); *H04L 67/12* (2013.01); *H04W 4/046* (2013.01)

(58) Field of Classification Search
CPC ...... H04W 4/021; H04W 4/023; H04W 4/025; H04W 4/028; H04W 28/0226; H04W 40/12; H04W 40/20; H04W 40/205; H04W 4/027; H04W 4/046; H04L 67/322; H04L 67/12; H04B 1/3822
USPC ........................................ 455/456.3
See application file for complete search history.

(56) References Cited

U.S. PATENT DOCUMENTS

| | | | |
|---|---|---|---|
| 2008/0162036 A1* | 7/2008 | Breed ........................... | 701/207 |
| 2009/0300688 A1* | 12/2009 | Karaoguz ........ | H04N 21/23805 725/62 |
| 2012/0172033 A1* | 7/2012 | Hilton ..................... | G01S 19/14 455/423 |
| 2014/0200038 A1* | 7/2014 | Rao et al. ..................... | 455/457 |
| 2014/0274119 A1* | 9/2014 | Venkatraman et al. ... | 455/456.1 |

FOREIGN PATENT DOCUMENTS

| | | |
|---|---|---|
| JP | 2004193995 | 7/2004 |
| JP | 2005156169 | 6/2005 |
| JP | 2011033361 | 2/2011 |

* cited by examiner

*Primary Examiner* — Nathan Mitchell
(74) *Attorney, Agent, or Firm* — Frank MacKenzie; Bejin Bieneman PLC

(57) ABSTRACT

A vehicle includes a communication interface, a memory device, and a processing device. The communication interface is configured to communicate over a communication network. The memory device is configured to store a connectivity map associated with a geographic area. The connectivity map defines a communication quality at a plurality of locations in the geographic area. The processing device is configured to initiate a remote data transfer over the communication network in accordance with the connectivity map.

20 Claims, 2 Drawing Sheets

CROWD ENHANCED CONNECTIVITY MAP FOR DATA TRANSFER INTERMITTENCY MITIGATION

BACKGROUND

Vehicles send and receive a wide variety of communication signals. The signals may be sent from other vehicles, infrastructure devices, mobile devices such as cell phones, key fobs, radio stations, etc. Remote areas do not always have the infrastructure to deliver signals to vehicles. While urban areas are more likely to have sufficient infrastructure, they often have many obstructions that prevent signals from reaching the vehicle. In addition, signals can interfere with one another if transmitted in similar frequency bands. Interference can also occur when too many devices and vehicles are attempting to communicate over the same network infrastructure.

DETAILED DESCRIPTION

An exemplary vehicle includes a communication interface, a memory device, and a processing device. The communication interface is configured to communicate over a communication network. The memory device is configured to store a connectivity map associated with a geographic area. The connectivity map defines a communication quality at a plurality of locations in the geographic area. The processing device is configured to initiate a remote data transfer over the communication network in accordance with the connectivity map. Thus, the vehicle will only communicate with the remote server at locations where it is likely that the remote data transfer will be completed prior to, e.g., the vehicle entering a "dead zone" where communication with the remote server is not possible or reliable.

The vehicle and system shown in the FIGS. may take many different forms and include multiple and/or alternate components and facilities. The exemplary components illustrated are not intended to be limiting. Indeed, additional or alternative components and/or implementations may be used.

Figure 1:
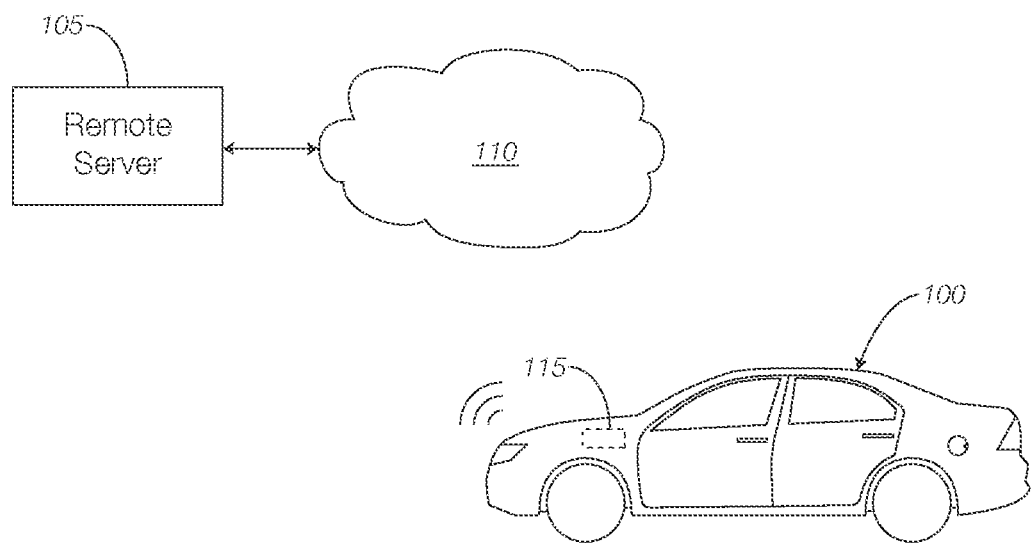
FIG. 1 illustrates an exemplary vehicle configured to mitigate data transfer intermittency.

As illustrated in FIG. 1, a vehicle 100 is configured to mitigate data transfer intermittency when communicating with, e.g., a remote server 105. Although illustrated as a sedan, the vehicle 100 may include any passenger or commercial vehicle such as a car, a truck, a sport utility vehicle, a taxi, a bus, etc. In some possible approaches, as discussed below, the vehicle 100 is an autonomous vehicle configured to operate in an autonomous (e.g., driverless) mode, a partially autonomous mode, and/or a non-autonomous mode.

The remote server 105 may be configured to store and/or transmit information pertaining to the vehicle 100. Examples of such information may include software, software updates, and/or firmware associated with one or more components of the vehicle 100 including the engine controller, the body controller, the transmission controller, the autonomous mode controller, the navigation system, the entertainment system, the climate control system, or the like. The remote server 105 may be configured to transmit and/or receive data over a communication network 110 in accordance with any number of communication protocols. In some possible implementations, the remote server 105 may be configured to conduct data transfers in response to a query from the vehicle 100. In other possible approaches, the remote server 105 may be configured to conduct data transfers according to a schedule or without a request from the vehicle 100.

Figure 2:
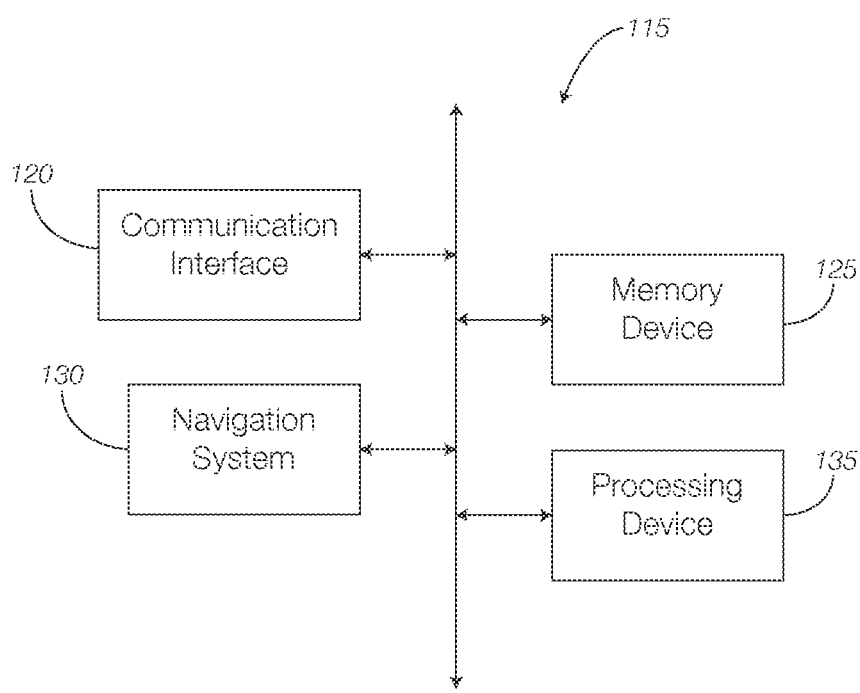
FIG. 2 is a diagram of an exemplary system used in the vehicle of FIG. 1.

FIG. 2 is a block diagram of an exemplary system 115 that may be incorporated into the vehicle 100 of FIG. 1. As illustrated, the system 115 includes a communication interface 120, a memory device 125, a navigation system 130, and a processing device 135.

The communication interface 120 may be configured to facilitate wired and/or wireless communication between the components of the vehicle 100 and other devices, such as the remote server 105. The communication interface 120 may be configured to conduct data transfers with the remote server 105 over, e.g., the communication network 110. For instance, the communication interface 120 may be configured to receive messages from, and transmit messages to, a cellular provider's tower and the vehicle's Telematics Service Delivery Network (SDN) that, in turn, establishes communication with a user's mobile device such as a cell phone, a tablet computer, a laptop computer, a fob, or any other electronic device configured for wireless communication via a secondary or the same cellular provider. Cellular communication to the vehicle 100's telematics transceiver through the SDN may also be initiated from an internet connected device such as a PC, Laptop, Notebook, or WiFi connected phone. The communication interface 120 may also be configured to communicate directly from the vehicle 100 to the user's remote device or any other device, such as the remote server 105, using any number of communication protocols such as Bluetooth®, Bluetooth® Low Energy, or WiFi.

The memory device 125 may include any number of non-volatile memory devices configured to store data and make the stored data accessible to one or more systems and components of the vehicle 100. In one possible approach, the memory device 125 may be configured to store a connectivity map associated with a geographic area including along a route to a predetermined destination. The connectivity map may define a communication quality at a plurality of locations in the geographic area. The communication quality may define the expected data transfer quality values at a particular location. Accordingly, the connectivity map may indicate where along the route the vehicle 100 is able to reliably communicate with the remote server 105 over the communication network 110. The connectivity map may be generated by the processing device 135, as discussed in greater detail below. Alternatively, generation of the connectivity map may be crowd-sourced. Thus, some or all of the connectivity map stored in the memory device 125 may be generated from partial or whole connectivity maps received from other vehicles via a vehicle-to-vehicle communication protocol. In some possible approaches, the connectivity map may be received from the remote server 105. For example, data concerning communication quality may be collected by multiple vehicles and aggregated in a database at the remote server 105. The remote server 105 may periodically transmit updated connectivity maps to one or more vehicles 100, and in particular, in response to a vehicle 100 identifying a location where the observed communication quality is different than expected or identified in the connectivity map.

The navigation system 130 may be configured to determine a position of the vehicle 100, such as a current location of the vehicle 100. The navigation system 130 may include a Global Positioning System (GPS) receiver configured to triangulate the position of the vehicle 100 relative to satellites or terrestrial based transmitter towers. The navigation system 130, therefore, may be configured for wireless communication. The navigation system 130 may be further configured to develop routes from the current location to a selected destination, as well as display a map and present driving directions to the selected destination via, e.g., a user interface device. In some instances, the navigation system 130 may develop the route according to a user preference. Examples of user preferences may include maximizing fuel efficiency, reducing travel time, travelling the shortest distance, or the like.

The processing device 135 may be configured to initiate a remote data transfer over the communication network 110 in accordance with the connectivity map. For instance, the processing device 135 may be configured to determine one or more locations, including the current location, the selected destination, and locations along the route to the selected destination, of the vehicle 100 from the navigation system 130. The processing device 135 may be configured to access the connectivity map from the memory device 125, determine the communication qualities at each of the determined locations, and compare the communication qualities to a predetermined threshold, which may define the minimum acceptable communication quality for remote data transfers. The processing device 135 may be configured to initiate a remote data transfer anywhere the communication quality meets or exceeds the predetermined threshold. Initiating the remote data transfer may include uploading data to the remote server 105, downloading data from the remote server 105, or continuing to upload data to, or download data from, the remote server 105.

In addition to considering the communication quality at a number of locations, the processing device 135 may further consider other factors such as the amount of data to be transferred, the transfer speed, the distance between locations, and the expected speed of the vehicle 100 when determining whether to initiate a remote data transfer. For instance, if initiating the data transfer from the present location would not allow the data transfer to complete because of one or more "dead zones" (i.e., areas along the route where the vehicle 100 will not be able to communicate with the remote server 105), the processing device 135 may elect to wait to initiate the remote data transfer until the vehicle 100 has passed through all dead zones along the route. Alternatively, the processing device 135 may be configured to initiate the remote data transfer between "dead zones" if there is sufficient time for the remote data transfer to complete before the vehicle 100 enters the next "dead zone." Instead of waiting to initiate the data transfer, the processing device 135 may be configured to "pause" a remote data transfer prior to entering a "dead zone" and resume the remote data transfer when communication with the remote server 105 is available.

In some instances, the processing device 135 may be configured to generate the connectivity map. For example, when not conducting a remote data transfer, the processing device 135 may be configured to determine the communication quality at a plurality of locations. The processing device 135 may determine the current location from the navigation system 130 and the communication quality from the communication interface 120. The communication quality may be based on any number of factors such as, e.g., a signal strength. The processing device 135 may associate each communication quality determined with a location, and store the associated communication quality and location in a database in the memory device 125 as the connectivity map. In some instances, the processing device 135 may be configured to share some or all of the connectivity map stored in the memory device 125 with other vehicles in accordance with, e.g., a vehicle-to-vehicle communication protocol.

Moreover, the processing device 135 may be configured to determine whether the connectivity map needs to be updated. For instance, the processing device 135 may compare an observed data transfer quality to at least one communication quality defined by the connectivity map. The processing device 135 may determine that the connectivity map needs to be updated if the observed data transfer quality is significantly different from the communication quality defined by the connectivity map for at least that particular location, in which case the remote server 105 may transmit an updated connectivity map.

Figure 3:
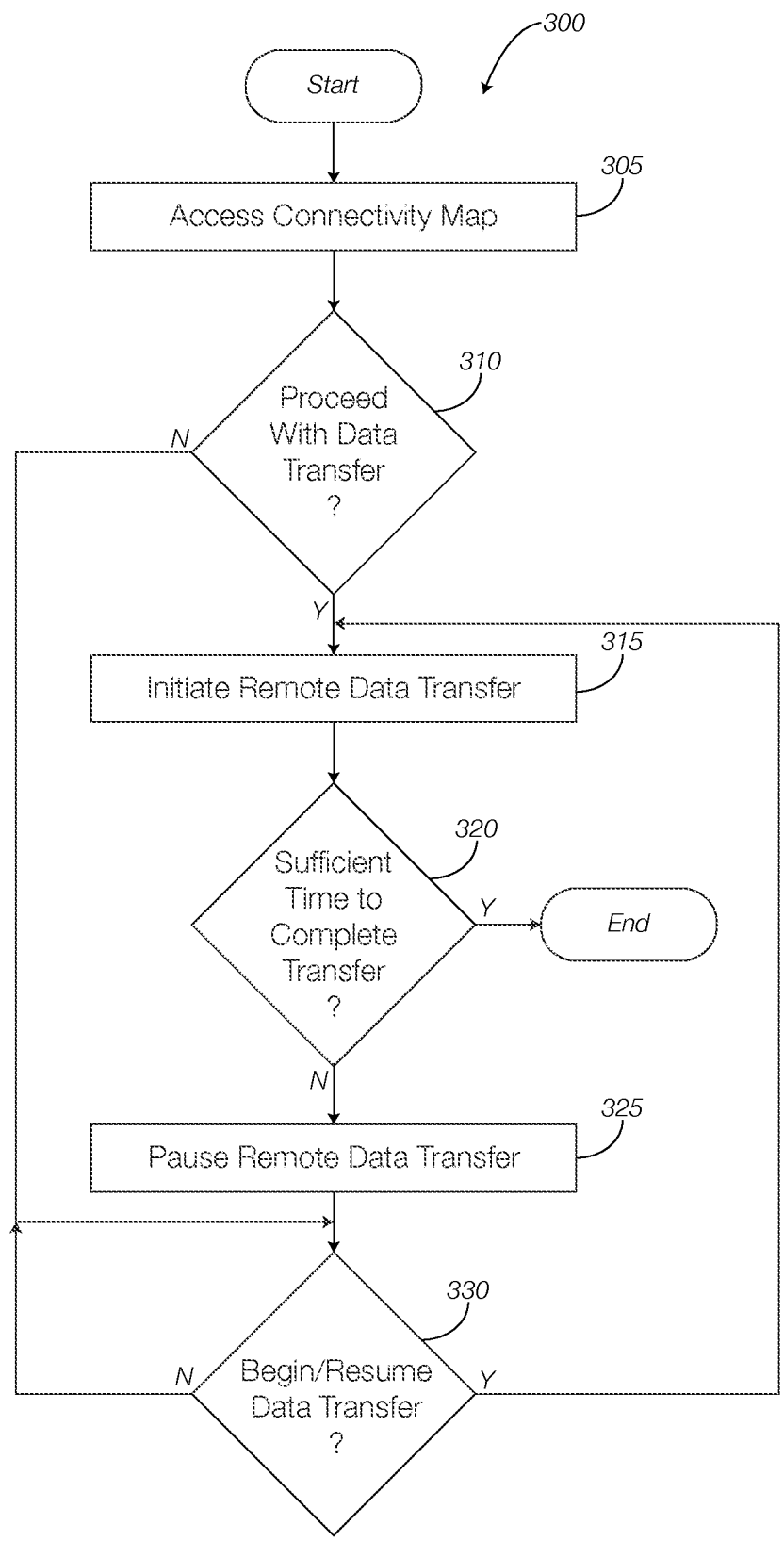
FIG. 3 is a flowchart of an exemplary process that may be used to mitigate data transfer intermittency.

FIG. 3 is a flowchart of an exemplary process 300 that may be implemented by one or more components of the vehicle 100 of FIG. 1 and system 115 of FIG. 2. The process 300 may be initiated prior to any communication between the vehicle 100 and the remote server 105.

At block 305, the processing device 135 may access a connectivity map that defines the communication quality at a plurality of locations within a geographic area. As discussed above, the connectivity map may be stored in the memory device 125. The connectivity map may be generated by the processing device 135 by, e.g., associating a measured or determined communication quality to each of a number of locations in a database and storing the database as the connectivity map in the memory device 125. Alternatively, the connectivity map may be generated, in whole or in part, by connectivity maps received from other vehicles or the remote server 105.

At decision block 310, the processing device 135 may determine whether to proceed with the remote data transfer. For instance, the processing device 135 may compare the communication quality at various locations to a predetermined threshold. For instance, the processing device 135 may identify the current location, the selected destination, and the locations along the route to the selected destination from the navigation system 130. Using the connectivity map, the processing device 135 may determine the communication quality at each identified location. If the communication quality at the current location exceeds the predetermined threshold, the process 300 may continue at block 315. If the communication quality at the current location does not exceed the predetermined threshold, the process 300 may continue at block 330.

At block 315, the processing device 135 may initiate the remote data transfer over the communication network 110. Initiating the remote data transfer may include uploading data to the remote server 105 and/or downloading data from the remote server 105. Moreover, initiating the remote data transfer may include resuming a previous data transfer that may have been paused when, e.g., the vehicle 100 entered a "dead zone."

At decision block 320, the processing device 135 may determine whether there is sufficient time to complete the remote data transfer. For example, the processing device 135 may consider factors such as the amount of data to be transferred, the transfer speed, the distance between locations, and the expected speed of the vehicle 100 when determining whether the data transfer can be completed before the vehicle 100 reaches the next dead zone. If there is sufficient time to complete the remote data transfer, the process 300 may end. If there is not sufficient time to complete the data transfer, the process 300 may continue at block 325.

At block 325, the processing device 135 may pause the remote data transfer prior to reaching the next "dead zone." This way, the vehicle 100 is less likely to lose communication with the remote server 105 in the middle of the data transfer. The process 300 may continue at block 330 after the remote data transfer is paused.

At decision block 330, the processing device 135 may determine whether to begin or resume the remote data transfer. The remote data transfer may begin or resume as soon as the vehicle 100 has cleared the "dead zone," meaning the vehicle 100 is now able to communicate with the remote server 105 over the communication network 110. If the processing device 135 determines to begin or resume the remote data transfer, the process 300 may continue at block 315. If the processing device 135 determines not to begin or resume the remote data transfer, which may occur if the vehicle 100 is still in the "dead zone," the process 300 may continue at block 330.

In general, computing systems and/or devices, such as the processing device 135, may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
    a communication interface configured to communicate over a communication network;
    a memory device configured to store a connectivity map associated with a geographic area, the connectivity map defining a communication quality at a plurality of locations in the geographic area; and
    a processing device programmed to initiate a remote data transfer over the communication network in accordance with the connectivity map, determine from the connectivity map whether a vehicle is heading toward a location with poor communication quality and determine whether there is time to complete the remote data transfer before reaching the location with poor communication quality, and
        if the remote data transfer has already begun and the remote data transfer cannot be completed before reaching the location with poor communication quality, the processing device is programmed to pause a pending remote data transfer prior to the vehicle arriving at the location with poor communication quality, and
        if the data transfer has not yet begun and the remote data transfer cannot be completed before reaching the location with poor communication quality, the processing device is programmed to wait to initiate the remote data transfer until after the vehicle is through the location with poor communication quality.

2. The vehicle system of claim 1, wherein, after pausing the pending remote data transfer, the processing device is programmed to compare the communication quality at a present location to a threshold.

3. The vehicle system of claim 2, wherein the processing device is programmed to resume the paused remote data transfer if the communication quality at the present location exceeds the threshold.

4. The vehicle system of claim 1, wherein the remote data transfer includes uploading data to a remote server.

5. The vehicle system of claim 1, wherein the remote data transfer includes downloading data from a remote server.

6. The vehicle system of claim 1, wherein the processing device is configured to compare an observed data transfer quality to at least one communication quality defined by the connectivity map, and wherein the connectivity map is updated if the observed data transfer quality is different from the communication quality defined by the connectivity map.

7. The vehicle system of claim 6, wherein the processing device is configured to determine the communication quality at a plurality of locations and generate the connectivity map by associating the determined communication quality to at least one of the plurality of locations.

8. The vehicle system of claim 1, wherein the connectivity map is received at the communication interface in accordance with a vehicle-to-vehicle communication protocol.

9. The vehicle system of claim 1, wherein the connectivity map is received at the communication interface from a remote server.

10. A vehicle system comprising:
    a processing device programmed to initiate a remote data transfer over a communication network in accordance with a connectivity map, the connectivity map defining a communication quality at a plurality of locations within a geographic area,
    wherein the processing device is programmed to determine from the connectivity map whether a vehicle is heading toward a location with poor communication quality and determine whether there is time to complete the remote data transfer before reaching the location with poor communication quality, and if the remote data transfer cannot be completed before reaching the location with poor communication quality, the processing device is programmed to:
        pause a pending remote data transfer prior to the vehicle arriving at the location with poor communication quality, and
        wait to initiate a new remote data transfer until after the vehicle is through the location with the poor communication quality.

11. The vehicle system of claim 10, wherein, after pausing the pending remote data transfer, the processing device is programmed to compare the communication quality at a present location to a threshold.

12. The vehicle system of claim 11, wherein the processing device is programmed to resume the paused remote data transfer if the communication quality at the present location exceeds the threshold.

13. The vehicle system of claim 10, wherein the remote data transfer includes uploading data to a remote server.

14. The vehicle system of claim 10, wherein the remote data transfer includes downloading data from a remote server.

15. The vehicle system of claim 10, wherein the processing device is configured to compare an observed data transfer quality to at least one communication quality defined by the connectivity map, and wherein the connectivity map is updated if the observed data transfer quality is different from the communication quality defined by the connectivity map.

16. The vehicle system of claim 15, wherein the processing device is configured to determine the communication quality at a plurality of locations and generate the connectivity map by associating the determined communication quality to at least one of the plurality of locations.

17. The vehicle system of claim 10, wherein the connectivity map is received in accordance with a vehicle-to-vehicle communication protocol.

18. The vehicle system of claim 10, wherein the connectivity map is received from a remote server.

19. A method comprising:
accessing a connectivity map defining a communication quality at a plurality of locations within a geographic area;
comparing the communication quality at one of the plurality of locations to a threshold;
initiating a remote data transfer over a communication network if the communication quality at one of the plurality of locations exceeds the threshold;
determining from the connectivity map whether a vehicle is heading toward a location with poor communication quality;
determining whether there is time to complete the remote data transfer before the vehicle reaches the location with poor communication quality; and
if the remote data transfer cannot be completed before reaching the location with poor communication quality:
for a pending remote data transfer:
pausing the pending remote data transfer prior to the vehicle arriving at the location with poor communication quality;
determining a communication quality at a present location; and
resuming the pending remote data transfer if the communication quality at the present location exceeds the threshold; and
for a new remote data transfer:
waiting to initiate the new remote data transfer until the vehicle is through the location with poor communication quality.

20. The method of claim 19, wherein the remote data transfer includes at least one of uploading data to a remote server and downloading data from the remote server.

* * * * *